United States Patent Office 3,090,801
Patented May 21, 1963

3,090,801
ARYL POLYBORONIC ACIDS AND ESTERS AND
PROCESS FOR THEIR PREPARATION
Robert M. Washburn, Whittier, and Franklin A. Billig,
Los Angeles, Calif., assignors to American Potash &
Chemical Corporation, a corporation of Delaware
No Drawing. Filed July 6, 1956, Ser. No. 596,159
7 Claims. (Cl. 260—462)

This invention relates to new and improved methods of preparing both new and previously known organo-boron compounds and to certain novel compounds as new compositions of matter. The compounds included in our invention are characterized by having carbon atoms bonded to boron atoms. The carbon-containing moiety may be aromatic or substituted aromatic. The general classes in which these compounds fall are the areneboronic acids, diareneborinic acids, and triarylborines. Specific examples of these classes of compounds are benzeneboronic acid, dibenzeneborinic acid and triphenylborine.

Organo-boron compounds falling within the various classes given above have been known for many years (Krause and Von Grosse, "Die Chemie der Metall-Organischen Verbindungen," Borntraeger, Berlin, 1937).

The method normally used to prepare areneboronic acids, diareneborinic acids, and triarylborines involves the reaction of the appropriate Grignard reagent with a borate ester or a boron trihalide.

The preparation of areneboronic acids by the usual method is shown in Equations 1 and 2, where Ar represents an aromatic radical and R represents an alkyl radical.

$$ArMgBr + (RO)_3B \rightarrow ArB(OR)_2 + Mg(OR)Br \quad (1)$$
$$ArB(OR)_2 + 2H_2O \rightarrow ArB(OH)_2 + 2ROH \quad (2)$$

The reaction represented by Equation 1 is usually performed by adding the appropriate Grignard reagent to a diethyl ether solution of the borate ester maintained at −60 to −80° C.

The preparation of diareneborinic acids by the usual method is shown in Equations 3 and 4.

$$2ArMgBr + (RO)_3B \rightarrow (Ar)_2BOR + 2Mg(OR)Br \quad (3)$$
$$(Ar)_2BOR + H_2O \rightarrow (Ar)_2BOH + ROH \quad (4)$$

The reaction represented by Equation 3 is usually performed by adding the appropriate Grignard reagent to a diethyl ether solution of the borate ester maintained at −60 to −80° C.

The preparation of triaryl borines by the usual method is shown in Equation 5.

$$3ArMgBr + BX_3 \rightarrow (Ar)_3B + 3MgBrX \quad (5)$$

This reaction is usually performed by adding the boron trihalide to an ethereal solution of the Grignard reagent.

We have found that aryl sodium compounds will react smoothly with borate esters to give high yields of areneboronic acids, diareneborinic acids, or triaryl borines. In general, the reaction of the present invention may be schematically represented as follows:

$$ArNa + (RO)_3B \longrightarrow ArB(OR)_n \xrightarrow{H_2O} ArB\begin{matrix}Z\\Y\end{matrix}$$

wherein $n$ is 0, 1, or 2, and Z and Y may be hydroxyl, in which case the compound is a boronic acid; or, Z may be the same as Ar and Y hydroxyl, in which case the compound is a borinic acid, or both Z and Y may be the same as Ar, in which case the compound is a borine. The relative proportions of the two reactants determine the compound obtained; thus, one equivalent of each compound yields the boronic acid; two equivalents of the sodium compound to one of the ester yields the borinic acid, and three equivalents of the sodium compound to one of the ester yields the borine.

Although the above simplified reaction represents the essence of the present invention, the aryl sodium compounds are not stable and it is generally preferred to start with the corresponding aromatic halide and cause the halide to react with finely dispersed metallic sodium in the presence of the borate ester. The dispersion of metallic sodium can be prepared in any suitable manner; an acceptable procedure is set forth in "Sodium Dispersions," published 1953 by National Distillers Chemical Company.

The reaction can be carried out in various manners without departing from the spirit of the invention. For example, it can be performed in individual steps as by first preparing the aryl sodium compound and then adding the borate ester (see Example II), or the aromatic halide, borate ester and sodium dispersion can be all combined together (see Example I), or the borate ester can be first placed in the reaction vessel and the preformed aryl sodium compound slowly added thereto (see Example III). Thus, the complete reaction as it is usually carried out may be represented by the following series of equations:

$$ArCl + 2Na \rightarrow ArNa + NaCl \quad (6)$$
$$ArNa + (RO)_3B \rightarrow ArB(OR)_2 + RONa \quad (7)$$
$$ArB(OR)_2 + 2H_2O \rightarrow ArB(OH)_2 + 2ROH \quad (8)$$

In similar fashion it can be seen that where a starting material of the type $ArCl_2$ or $ArCl_3$ is reacted with sodium in the fashion set forth above, $ArNa_2$ or $ArNa_3$ will be formed. This in turn can be reacted with the appropriate borate ester to form the di- and triboronic acids. This is set forth in more detail in Examples XV and XVIII infra. We do not wish to be limited in any sense by this explanation, since the mechanism of the reaction has not been determined.

As has been pointed out above, by adjusting the ratio of the aryl sodium compound to the trialkyl borate ester, the final product may be $ArB(OH)_2$, $Ar_2BOH$ or $Ar_3B$.

The invention can be practiced with any triborate ester and is not limited in this respect; thus, the reaction schematically represented above can be practiced successfully with any borate ester since the alcohol moiety of the ester does not enter into the final product. One can use any of the alkyl or aryl borate esters and while in the following examples the use of only trimethyl borate is shown, this was employed because it is relatively inexpensive and is in plentiful supply. One can use any of the trialkyl borate esters such as triethyl borate, tripropyl borate, triisopropyl borate or triphenyl borate ester.

Normally, it is preferred to run the reaction at atmospheric pressure and at a temperature below about 50° C., but it will be understood that other pressures and temperatures may be used.

EXAMPLE I

*Preparation of benzeneboronic acid (in situ proce-*

*dure*).—Chlorobenzene (56.3 g., 0.5 mole) and trimethyl borate (155.9 g., 1.5 mole) were placed in a three-necked flask equipped with a reflux condenser, stirrer and addition funnel. Sodium (50% dispersion in xylene, 46 g., containing 23 g. sodium) was added at such a rate that the temperature of the reaction mixture remained at 25–30° C. After all the sodium dispersion had been added, the reaction mixture was treated with methanol and water to hydrolyze dimethyl benzeneboronate. The mixture was then freed of xylene, methanol, and side reaction products by azeotropic distillation with water. Benzeneboronic acid (41% yield, M.P., 216° C., percent B, 8.7, theory 8.87) crystallized as white needles when the water residue was cooled.

EXAMPLE II

*Preparation of benzeneboronic acid (direct procedure)*.—Phenylsodium (25.0 g., 0.25 mole) was prepared from chlorobenzene and sodium using the equipment described in Example I. Methyl borate (28.0 g., 0.25 mole) was then added to the phenyl sodium at such a rate that the temperature of the reaction mixture remained below 30° C. After all the trimethyl borate had been added, the reaction mixture was treated with water, then neutralized with concentrated sulfuric acid. The mixture was freed of xylene, methanol, and side reaction products by azeotropic distillation with water. When the water residue was cooled, two layers formed. The mixture was extracted with ether, the ether removed by distillation. The resulting solids were separated into two portions by extraction with petroleum ether; 4.0 g. (13% yield) of benzeneboronic acid (M.P. 216° C.; percent B, 8.7, theory, 8.87) and 2.0 g. (8.8%), of dibenzeneborinic acid (percent B, 5.8, theory, 5.9).

EXAMPLE III

*Preparation of benzeneboronic acid (inverse procedure)*.—To a solution of methyl borate (52.0 g., 0.5 mole) and xylene in a three-necked, 500 ml. flask equipped with a condenser, stirrer and addition funnel, was added phenylsodium in xylene at such a rate that the temperature of the reaction mixture remained below 30° C. After the addition was complete, the mixture was hydrolyzed with water, neutralized with concentrated sulfuric acid, and extracted with ether. Ether, methanol, xylene, and side reaction products were removed by azeotropic distillation with water. Benzeneboronic acid (73.1 g., 60%) crystallized when the water residue was cooled.

The phenylsodium was prepared according to the directions given in "Sodium Dispersions," 1953, p. 21 ff., U.S. Industrial Chemicals. The equipment used was that described for the in situ preparation above. Chlorobenzene (28.14 g.; 0.25 mole) and 75 ml. xylene as a solvent were added during a 44 minute period to an agitated (4700 r.p.m.) 50% dispersion of sodium in xylene (23 g. containing 11.5 g. sodium, 0.5 mole) at such a rate that the pot temperature remained below 30° C. The reaction was considered complete when the pot temperature fell from 29° to 24° C. after all the chlorobenzene had been added.

EXAMPLES IV THROUGH XIX

In addition to benzeneboronic acid, dibenzeneboronic acid, and triphenyl borine, additional substituted aromatic boronic acids can be prepared, as is shown in the attached Table I, in which the several examples are set forth in consecutive order. In each case, the aromatic boron compound formed has the aromatic moiety bonded directly to the boron atom.

EXAMPLES XX–XXX

In addition to the various areneboronic acids, arenepolyboronic acids, diareneborinic acids and triarylborines, described in Examples I–XIX, the anhydrides of arene- boronic, arenepolyboronic, and diareneborinic acids can be obtained as the products in our process.

The anhydrides of areneboronic and diareneborinic acids have been prepared by dehydrating the acid [Michaelis and Becker, Ber., 15, 181 (1882)], as shown in Equations 9 and 10 (Ar=aromatic).

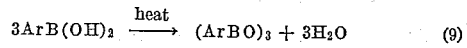
$$3ArB(OH)_2 \xrightarrow{heat} (ArBO)_3 + 3H_2O \qquad (9)$$

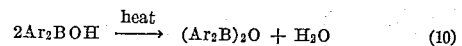
$$2Ar_2BOH \xrightarrow{heat} (Ar_2B)_2O + H_2O \qquad (10)$$

We have found that instead of isolating the acid (Example I, et seq.), the anhydride can be obtained if the product is heated. Table II gives examples of some anhydrides of areneboronic, arenepolyboronic, and diareneborinic acids which can be obtained in this way.

EXAMPLES XXXI–XL

In addition to the various areneboronic acids, diareneborinic acids, triarylborines, and arenepolyboronic acids described in Examples I–XXX, the esters of areneboronic, arenepolyboronic, and diareneborinic acids can be obtained as products in our process.

Esters of areneboronic and diareneborinic acids have been reportedly prepared by the reaction of an alcohol with an areneboronyl dihalide or a diareneborinyl halide [Krause and Von Grosse, "Die Chemie der Metall-Organischen Verbindungen," Borntraeger, Berlin, 1937], or by the direct reaction of the areneboronic or diareneborinic acid with an alcohol [Torsell, Acta. Chem. Scand., 8, 1779 (1954)].

The reported preparations are illustrated in Equations 11, 12, 13, and 14 (Ar=aromatic, X=halogen, and R=alkyl).

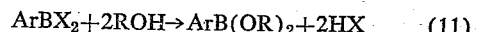
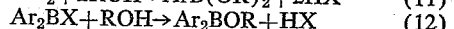
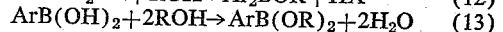
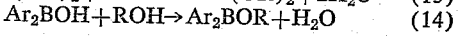
$$ArBX_2 + 2ROH \rightarrow ArB(OR)_2 + 2HX \qquad (11)$$
$$Ar_2BX + ROH \rightarrow Ar_2BOR + HX \qquad (12)$$
$$ArB(OH)_2 + 2ROH \rightarrow ArB(OR)_2 + 2H_2O \qquad (13)$$
$$Ar_2BOH + ROH \rightarrow Ar_2BOR + H_2O \qquad (14)$$

In Example I, et seq., the reaction mixture was treated with methanol and water to hydrolyze dimethyl benzeneboronate. The free acid thus obtained can be esterified with any suitable alcohol. The ester can, however, be removed as such by extraction with ether and purified by distillation.

Examples of esters of areneboronic, arenepolyboronic, and diareneborinic acid which can thus be obtained are given in Table III.

A variety of arene substituents are disclosed in Examples I through XL, including for example, phenyl, phenylene, phenenyl, biphenylyl, naphthyl, tolyl, zylyl, nitrophenyl, N,N-diethylaminophenyl, bromophenyl, chlorophenyl and lower alkoxyphenyl substituents.

The new process described provides the following improvements and advantages:

(1) Eliminates the use of the Grignard reagent which is expensive and hazardous.

(2) Permits working at higher temperatures than the usual —80° C., thus saving cost of refrigeration.

(3) Greatly reduces the expense in preparing aromatic organo-boron compounds by using cheaper reagents and a simpler process.

(4) Permits the preparation of compounds containing a high boron-to-carbon ratio by a simple procedure.

(5) Permits the direct preparation of amino- and nitro-substituted aromatic organo-boron compounds.

The arenepolyboronic acids, their anhydrides and esters, are useful as insecticides. The numerous compounds disclosed herein and which are arenepolyboronic acids or substituted arenepolyboronic acids and the corresponding anhydrides and esters, were tested under the conditions set forth by Beran, Prey and Bohm, Mitt. Chem. Forsch Inst., Wirtsch, Osterr, 6, 54–56 (1952), and were found to be far more effective than the simple boronic acids and substituted boronic acids.

Table I

| | Starting halide | Mol. wt. | Moles of aryl sodium compound | Moles of borate ester | Product, mol. wt. | Product B | Product |
|---|---|---|---|---|---|---|---|
| IV | 4-CH₃O-C₆H₄-Cl | 142.59 | 0.25 | 0.25 | 151.96 | 7.12 | CH₃O-C₆H₄-B(OH)₂ |
| V | 4-C₆H₅-C₆H₄-Cl | 188.64 | 0.25 | 0.25 | 198.03 | 5.46 | C₆H₅-C₆H₄-B(OH)₂ |
| VI | 4-C₂H₅O-C₆H₄-Cl | 156.61 | 0.25 | 0.25 | 165.99 | 6.52 | C₂H₅O-C₆H₄-B(OH)₂ |
| VII | 2-CH₃-C₆H₄-Cl | 126.59 | 0.25 | 0.25 | 135.96 | 7.96 | 2-CH₃-C₆H₄-B(OH)₂ |
| VIII | 3-CH₃-C₆H₄-Cl | 126.59 | 0.25 | 0.25 | 135.96 | 7.96 | 3-CH₃-C₆H₄-B(OH)₂ |
| IX | 2-NO₂-C₆H₄-Cl | 157.56 | 0.25 | 0.25 | 134.94 | 8.02 | O₂N-C₆H₄-B(OH)₂ |
| X | 4-CH₃-C₆H₄-Cl | 126.59 | 0.50 | 0.25 | 210.08 | 5.15 | (CH₃-C₆H₄)₂B-OH |
| XI | 4-CH₃-C₆H₄-Cl | 126.59 | 0.75 | 0.25 | 284.20 | 3.81 | (CH₃-C₆H₄)₃B |
| XII | 4-CH₃-C₆H₄-Cl | 126.59 | 0.25 | 0.25 | 135.96 | 7.96 | CH₃-C₆H₄-B(OH)₂ |
| XIII | 2,4-(CH₃)₂-C₆H₃-Cl | 140.61 | 0.25 | 0.25 | 149.99 | 7.21 | 2,4-(CH₃)₂-C₆H₃-B(OH)₂ |
| XIV | 1,4-Cl₂-C₆H₄ | 147.00 | 0.25 | 0.25 | 156.38 | 6.92 | Cl-C₆H₄-B(OH)₂ |
| XV | 1,4-Cl₂-C₆H₄ | 147.00 | 0.25 | 0.50 | 165.76 | 13.05 | (HO)₂B-C₆H₄-B(OH)₂ |
| XVI | 1,4-Br₂-C₆H₄ | 235.92 | 0.25 | 0.25 | 200.85 | 9.65 | Br-C₆H₄-B(OH)₂ |

Table I—Continued

| | Starting halide | Mol. wt. | Moles of aryl sodium compound | Moles of borate ester | Product, mol. wt. | Percent B | Product |
|---|---|---|---|---|---|---|---|
| XVII | (C$_2$H$_5$)$_2$N–C$_6$H$_4$–Cl | 183.68 | 0.25 | 0.25 | 193.06 | 5.60 | (C$_2$H$_5$)$_2$N–C$_6$H$_4$–B(OH)$_2$ |
| XVIII | 1,3,5-trichlorobenzene | 181.45 | 0.25 | 0.75 | 209.59 | 15.49 | 1,3,5-C$_6$H$_3$[B(OH)$_2$]$_3$ |
| XIX | 1-bromonaphthalene | 207.08 | 0.25 | 0.25 | 171.99 | 6.29 | 1-naphthyl–B(OH)$_2$ |

Table II

| No. | Starting acid | Moles acid | Moles H$_2$O removed | Product, mol. wt. | Percent B | Anhydride |
|---|---|---|---|---|---|---|
| XX | CH$_3$O–C$_6$H$_4$–B(OH)$_2$ | 0.5 | 0.5 | 401.84 | 8.08 | (CH$_3$O–C$_6$H$_4$–BO)$_3$ |
| XXI | C$_6$H$_5$–C$_6$H$_4$–B(OH)$_2$ | 0.5 | 0.5 | 540.04 | 6.04 | (C$_6$H$_5$–C$_6$H$_4$–BO)$_3$ |
| XXII | Cl–C$_6$H$_4$–B(OH)$_2$ | 0.5 | 0.5 | 415.11 | 7.82 | (Cl–C$_6$H$_4$–BO)$_3$ |
| XXIII | CH$_3$–C$_6$H$_4$–B(OH)$_2$ | 0.5 | 0.5 | 353.84 | 9.17 | (CH$_3$–C$_6$H$_4$–BO)$_3$ |
| XXIV | o-CH$_3$–C$_6$H$_4$–B(OH)$_2$ | 0.5 | 0.5 | 353.84 | 9.17 | (o-CH$_3$–C$_6$H$_4$–BO)$_3$ |
| XXV | O$_2$N–C$_6$H$_4$–B(OH)$_2$ | 0.5 | 0.5 | 446.76 | 7.27 | (O$_2$N–C$_6$H$_4$–BO)$_3$ |
| XXVI | (CH$_3$–C$_6$H$_4$)$_2$BOH | 0.5 | 0.25 | 402.14 | 5.38 | [(CH$_3$–C$_6$H$_4$)$_2$B]$_2$O |
| XXVII | (Cl–C$_6$H$_4$)$_2$BOH | 0.5 | 0.25 | 483.84 | 4.47 | [(Cl–C$_6$H$_4$)$_2$B]$_2$O |
| XXVIII | (O$_2$N–C$_6$H$_4$)$_2$BOH | 0.5 | 0.25 | 526.04 | 4.11 | [(O$_2$N–C$_6$H$_4$)$_2$B]$_2$O |
| XXIX | (HO)$_2$B–C$_6$H$_4$–B(OH)$_2$ | 0.25 | 0.50 | 129.73 | 16.68 | (–OB–C$_6$H$_4$–BO–)$_x$ |
| XXX | 1,3,5-C$_6$H$_3$[B(OH)$_2$]$_3$ | 0.25 | 0.75 | 311.09 | 10.43 | [1,3,5-C$_6$H$_3$(BO)$_3$]$_x$ |

Table III

| Exp. No. | Acid | Moles of alcohol | Moles of acid | Product, mol. wt. | Percent B | Ester |
|---|---|---|---|---|---|---|
| XXXI | $CH_3O\text{-}C_6H_4\text{-}B(OH)_2$ | 0.2 | 0.1 | 180.01 | 6.01 | $CH_3O\text{-}C_6H_4\text{-}B(OCH_3)_2$ |
| XXXII | $CH_3O\text{-}C_6H_4\text{-}B(OH)_2$ | 0.2 | 0.1 | 264.17 | 4.10 | $CH_3O\text{-}C_6H_4\text{-}B(OC_4H_9)_2$ |
| XXXIII | $O_2N\text{-}C_6H_4\text{-}B(OH)_2$ | 0.2 | 0.1 | 194.96 | 5.55 | $O_2N\text{-}C_6H_4\text{-}B(OCH_3)_2$ |
| XXXIV | $O_2N\text{-}C_6H_4\text{-}B(OH)_2$ | 0.2 | 0.1 | 279.15 | 3.88 | $O_2N\text{-}C_6H_4\text{-}B(OC_4H_9)_2$ |
| XXXV | $(CH_3\text{-}C_6H_4\text{-})_4B_2O$ | 0.1 | 0.1 | 224.11 | 4.83 | $(CH_3\text{-}C_6H_4\text{-}BOCH_3)_2$ |
| XXXVI | $(Cl\text{-}C_6H_4\text{-})_4B_2O$ | 0.1 | 0.1 | 271.58 | 3.98 | $(Cl\text{-}C_6H_4\text{-}BOC_4H_9)_2$ |
| XXXVII | $(O_2N\text{-}C_6H_4\text{-})_4B_2O$ | 0.1 | 0.1 | 272.05 | 3.98 | $(O_2N\text{-}C_6H_4\text{-}BOCH_3)_2$ |
| XXXVIII | $(O_2N\text{-}C_6H_4\text{-})_4B_2O$ | 0.1 | 0.1 | 324.10 | 3.34 | $(O_2N\text{-}C_6H_4\text{-}BOC_4H_9)_2$ |
| XXXIX | $(HO)_2B\text{-}C_6H_4\text{-}B(OH)_2$ | 0.4 | 0.1 | 221.87 | 9.75 | $(CH_3O)_2B\text{-}C_6H_4\text{-}B(OCH_3)_2$ |
| XL | $C_6H_3[B(OH)_2]_3$ | 0.6 | 0.1 | 293.75 | 11.05 | $C_6H_3[B(OCH_3)_2]_3$ |

We claim:
1. As a new composition of matter, benzenediboronic acid.
2. As a new composition of matter, an organic compound having an aromatic nucleus and at least two —$B(OH)_2$ radicals attached to said nucleus, said aromatic nucleus being selected from a class consisting of phenylene and phenenyl.
3. As a new composition of matter, benzenetriboronic acid.
4. A process for the preparation of an arenepolyboronic acid ester comprising: contacting a compound of the formula $R(Na)_n$ where R is selected from the class consisting of phenyl, phenylene, phenenyl, biphenylyl, naphthyl, tolyl, zylyl, nitrophenyl, N,N-diethylaminophenyl, bromophenyl, chlorophenyl and lower alkoxyphenyl substituents and $n$ is 2 to 3 with a borate ester of the formula $(R'O)_3B$ wherein R' is selected from the class consisting of lower alkyl and phenyl, at least one mole of borate ester being provided for each mole of said Na.
5. The process of claim 4 wherein the ester so formed is thereafter hydrolyzed to the corresponding acid.
6. A process for the preparation of an arenepolyboronic acid ester comprising: contacting a compound of the formula $R(X)_n$ where X is halogen, R is selected from the class consisting of phenyl, phenylene, phenenyl, biphenylyl, naphthyl, tolyl, zylyl, nitrophenyl, N,N-diethylaminophenyl, bromophenyl, chlorophenyl and lower alkoxyphenyl substituents and $n$ is 2 to 3 with finely dispersed metallic sodium to form a compound of the formula $R(Na)_n$ and thereafter reacting said $R(Na)_n$ product so formed with a borate ester of the formula $(R'O)_3B$ wherein R' is selected from the class consisting of lower alkyl and phenyl, at least one-half mole of borate ester being provided for each mole of said metallic sodium.
7. The process of claim 6 wherein the ester so formed is thereafter hydrolyzed to the corresponding acid.

References Cited in the file of this patent

UNITED STATES PATENTS 2,012,372    Bockmuhl     Aug. 27, 1935
2,266,776    Leum     Dec. 23, 1941

OTHER REFERENCES

Beran et al.: Chem. Abs., vol. 46 (152), page 9766.
Brindley et al.: Chem. Soc. Jour. (London), 1955, pages 2956–8.
The Van Nostrand Chemist's Dictionary, D. Van Nostrand Co., Inc., New York (1953), pp. 40 and 44.